US006783234B1

(12) United States Patent
Hong

(10) Patent No.: US 6,783,234 B1
(45) Date of Patent: Aug. 31, 2004

(54) DETACHABLE SUNGLASS UNIT

(76) Inventor: Yong Sik Hong, GreenBll APT 101-604, GuokWo dong, Buk-Ku, Taegu (KR)

( * ) Notice: Subject to any disclaimer, the term of this patent is extended or adjusted under 35 U.S.C. 154(b) by 0 days.

(21) Appl. No.: 10/751,063

(22) Filed: Jan. 5, 2004

(30) Foreign Application Priority Data

Nov. 19, 2003 (KR) .................................. 20-2003-0036133

(51) Int. Cl.⁷ ................................................. G02C 9/00
(52) U.S. Cl. ........................................... 351/47; 351/57
(58) Field of Search .............................. 351/47, 57, 48, 351/58, 59, 41, 44

(56) References Cited

U.S. PATENT DOCUMENTS 4,955,707 A * 9/1990 Gazeley ........................ 351/47
5,118,178 A * 6/1992 Tuckman ...................... 351/57
6,089,708 A * 7/2000 Ku ................................ 351/47

* cited by examiner

Primary Examiner—Hung Xuan Dang
(74) Attorney, Agent, or Firm—Park & Sutton LLP; John K. Park

(57) ABSTRACT

A detachable sunglass unit for detachably attaching sunglasses to eyeglasses, includes two sunglass lenses, two sunglass frames for holding the sunglass lenses, a pivoting device provided between the sunglass frames, a sunglass connecting member extending from the pivoting device, and an eyeglass connecting member provided on the center of the eyeglasses and engaging with the sunglass connecting member. The connecting members use permanent magnets to keep the engaged state. The pivoting device includes an elastic connecting rod, and a pipe member that surrounds the connecting rod. The connecting rod includes end portions that are fixed to sunglass frames, and a bent portion between the end portions. The bent portion is inserted into the pipe member, and the internal diameter of the pipe member is smaller than the width of the bent portion, so that the bent portion is elastically deformed in the pipe member.

7 Claims, 3 Drawing Sheets

DETACHABLE SUNGLASS UNIT

BACKGROUND OF THE INVENTION

The present invention relates to a detachable sunglass unit that is detachably attached to general correction eyeglasses for near-sightedness or far-sightedness. More particularly, this invention relates to a detachable sunglass unit that can be attached to or detached from eyeglasses, and can be pivoted up and down with simpler construction and more convenient operation.

Detachable sunglass units have been widely used to temporarily attach sunglasses, which do not have legs for wearing, in front of eyeglasses. Such detachable sunglass units solved the inconvenience of exchanging eyeglasses and sunglasses according to ambient light conditions for people who wear correction eyeglasses. Also the lenses of such sunglass unit do not need eyesight correction function.

Some detachable sunglass units also have provided pivoting function of sunglass lenses so that the sunglass lenses can be pivoted away from the line of sight of a user. However, in the prior art, detachable sunglass units having pivoting function had complex constructions and were difficult to operate for attaching and pivoting sunglasses.

For example, there was a detachable sunglass unit having attaching means including permanent magnets at both ends. Corresponding attaching means were also provided at both ends of eyeglasses. Such construction has disadvantages that since attaching means are provided at both ends, they are tend to interfere with a part of human body, or a foreign object, and that aesthetic appearance of the glasses are degraded due to the attaching parts. Another example used clip type connecting means at the center of eyeglasses. This construction has disadvantages of complex structure, high manufacture cost, poor appearance, and attaching means occupying part of user's vision.

SUMMARY OF THE INVENTION

The present invention contrives to solve the disadvantage of the prior art.

An objective of the invention is to provide a simple and reliable construction for detachably attaching and pivoting auxiliary sunglasses.

Another objective of the invention is to reduce manufacturing cost of a detachable sunglass unit.

Still another objective of the invention is to provide neat appearance of the sunglass unit and eyeglasses when a user wears them.

Still another objective of the invention is to substantially improve convenience of operating the detachable sunglass unit. Operation of the unit includes attaching, detaching and pivoting the unit.

To achieve the above objectives, according to present invention, a detachable sunglass unit for detachably attaching sunglasses to eyeglasses includes a first sunglass lens, a second sunglass lens, a first sunglass frame holding the first sunglass lens, a second sunglass frame holding the second sunglass lens, a pivoting device provided between the first sunglass frame and the second sunglass frame, a sunglass-connecting member extending from the pivoting device, and an eyeglass-connecting member provided on the center of the eyeglasses and engaging with the sunglass connecting member.

The pivoting device includes an elastic connecting rod, and a pipe member that surrounds the connecting rod. The connecting rod includes a first end portion that is fixed to the first sunglass frame, a second end portion that is fixed to the second sunglass frame, and a bent portion between the first end portion and the second end portion. The bent portion is inserted into the pipe member, and the internal diameter of the pipe member is smaller than the width of the bent portion, so that the bent portion is elastically deformed in the pipe member.

The pivoting device further includes caps that engage with both ends of the pipe member.

The sunglass-connecting member is attached to the eyeglass-connecting member magnetically.

The eyeglass-connecting member includes a connector body, an insertion hole provided in the connector body, and an eyeglass permanent magnet provided in the connector body. The sunglass-connecting member includes an extension member that includes two ends, an insertion body and a sunglass permanent magnet. One end of the extension member is fixed to the pivoting device, and the insertion body is attached to the other end of the extension member. The sunglass permanent magnet is provided in the insertion body so that the sunglass permanent magnet contacts with the eyeglass permanent magnet when the insertion body is inserted into the insertion hole.

The insertion body and the sunglass permanent magnet may be integrated as a single part.

The insertion body of the sunglass-connecting member includes one or more stop projections, and the connector body of the eyeglass-connecting member includes one or more stop recesses that engage with the stop projections, so that excessive insertion of the insertion body into the insertion hole is prevented.

The advantages of the present invention are: (1) the detachable sunglass unit does not interfere with a wearer's vision, since the structures for attaching and pivoting are provided on the center of the eyeglasses, and they are very simple and compact; (2) the unit does not interfere with a foreign object or a part of human body; (3) the unit has a near appearance; (4) since the pivoting mechanism consists of small-diameter pipe that encloses the connecting bar, the mechanism is reliable and has neat appearance, and cheap to manufacture.

Although the present invention is briefly summarized, the fuller understanding of the invention can be obtained by the following drawings, detailed description and appended claims.

DESCRIPTION OF THE FIGURES

These and other features, aspects and advantages of the present invention will become better understood with reference to the accompanying drawings, wherein.

DETAILED DESCRIPTION OF THE INVENTION

Figure 1:
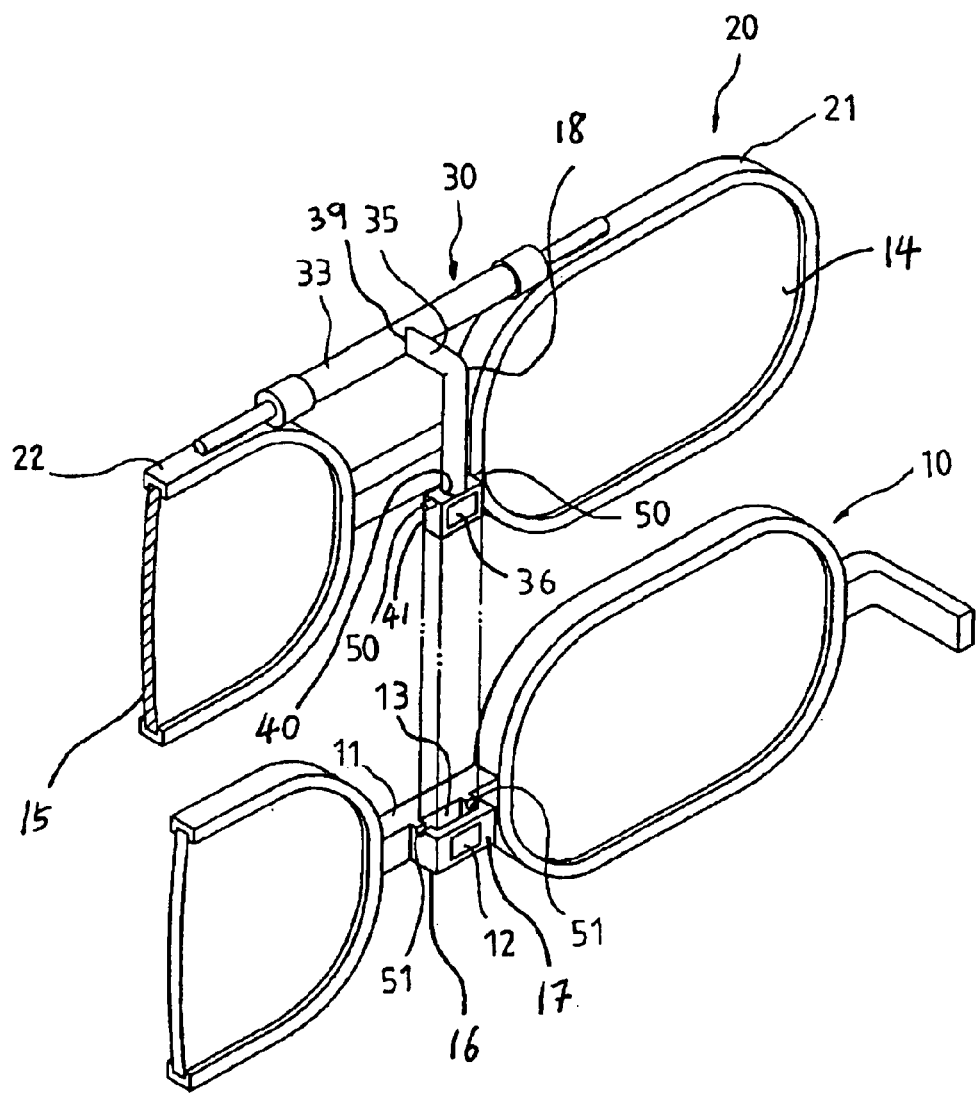
FIG. 1 is an illustrative perspective view showing a detachable sunglass unit, and eyeglasses to which the sunglass unit is detachably attached.

FIG. 1 shows a detachable sunglass unit 20 for detachably attaching sunglasses to eyeglasses 10 according to the present invention. The detachable sunglass unit 20 includes a first sunglass lens 14, a second sunglass lens 15, a first sunglass frame 21 holding the first sunglass lens 14, a second sunglass frame 22 holding the second sunglass lens 15, a pivoting device 30 provided between the first sunglass frame 21 and the second sunglass frame 22, a sunglass-connecting member 35 extending from the pivoting device 30, and an eyeglass-connecting member 16 provided on the center of the eyeglasses 10 and engaging with the sunglass connecting member 35.

Figure 2:
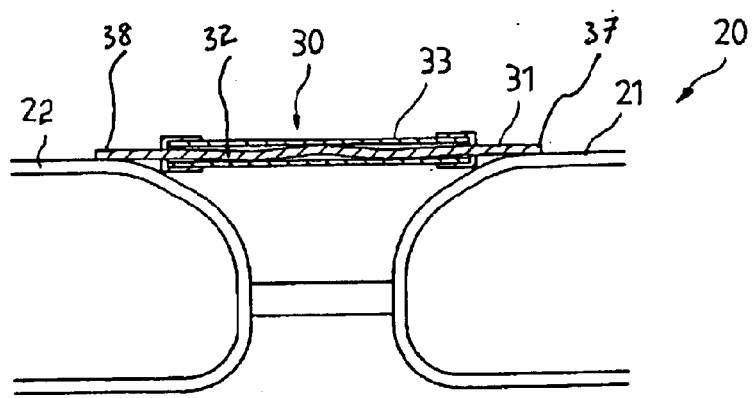
FIG. 2 is an elevation view of the sunglass unit in which a pivot device is shown in cross-section.
Figure 3:
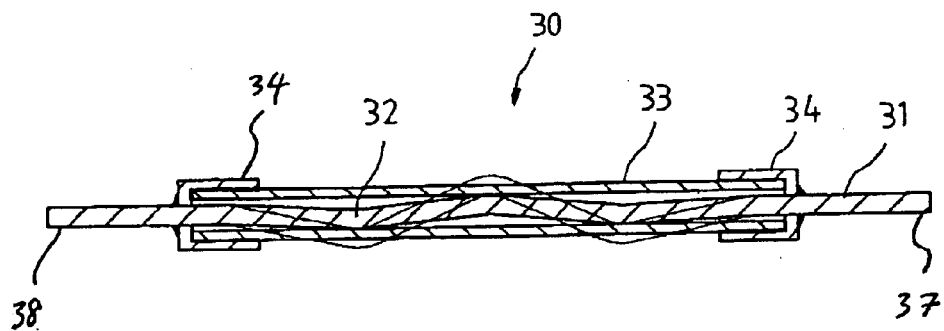
FIG. 3 is an enlarged cross-section view of the pivot device.

FIGS. 2 and 3 show the pivoting device 30. The pivoting device 30 includes an elastic connecting rod 31, and a pipe member 33 that surrounds the connecting rod 31. The connecting rod 31 includes a first end portion 37 that is fixed to an upper part of the first sunglass frame 21, a second end portion 38 that is fixed to an upper part of the second sunglass frame 22, and a bent portion 32 between the first end portion 37 and the second end portion 38. The bent portion 32 has one or more curved portion or two or more straight portions that change directions by bending. The bent portion 32 is inserted into the pipe member 33, and the internal diameter of the pipe member 33 is smaller than the width of the bent portion 32, so that the bent portion 32 is elastically deformed in the pipe member 33 smaller than its original width as shown well in FIG. 3.

The pivoting device further includes caps 34 that engage with both ends of the pipe member 33. The caps 34 prevent the pipe member 33 from moving along the connecting rod 31. The caps 34 might be welded to the connecting rod 31. The movement of caps 34 may be limited by the sunglass frames 21, 22.

Referring back to FIG. 1, the sunglass-connecting member 35 is attached to the eyeglass-connecting member 16 magnetically.

The eyeglass-connecting member 16 includes a connector body 17, an insertion hole 13 provided in the connector body 17, and an eyeglass permanent magnet 12 provided in the connector body 17.

The sunglass-connecting member 35 includes an extension member 18 that includes two ends 39, 40, an insertion body 41 and a sunglass permanent magnet 36. One end 39 of the extension member 18 is fixed to the center of the pipe member 33 of the pivoting device 30, and the insertion body 41 is attached to the other end 40 of the extension member 18. The extension member 18 extends from the pipe member 33 inward and downward. The sunglass permanent magnet 36 is provided in the insertion body 41 in a way that the sunglass permanent magnet 36 contacts with the eyeglass permanent magnet 12 when the insertion body 41 is inserted into the insertion hole 13.

The connector body 17 of the eyeglass-connecting member 16 is shown integrated with a center bridge 11 of the eyeglasses 10, but may be provided as a separate part that is fixed to the center bridge 11.

In the sunglass-connecting member 35, the insertion body 41 and the sunglass permanent magnet 36 may be integrated as a single part.

The insertion body 41 includes two stop projections 50 on its sides, and the connector body 17 includes two stop recesses 51 that engage with the stop projections 50. The stop recesses 51 are provided on the sides of the insertion hole 13. Excessive insertion of the insertion body 41 into the insertion hole 13 is prevented by the stop projections 50 and the stop recesses 51.

When it is needed to attach the detachable sunglass unit 20 to the eyeglasses 10, the insertion body 41 of the sunglass connecting member 35 is inserted into the insertion hole 13 of the eyeglass connecting member 16. The sunglass permanent magnet 36 and the eyeglass permanent magnet 12 keep the inserted state.

When the use of the detachable sunglass unit 20 is no longer necessary, the detachable sunglass unit 20 is pulled upward to take the insertion body 41 out of the insertion hole 13.

Figure 4:
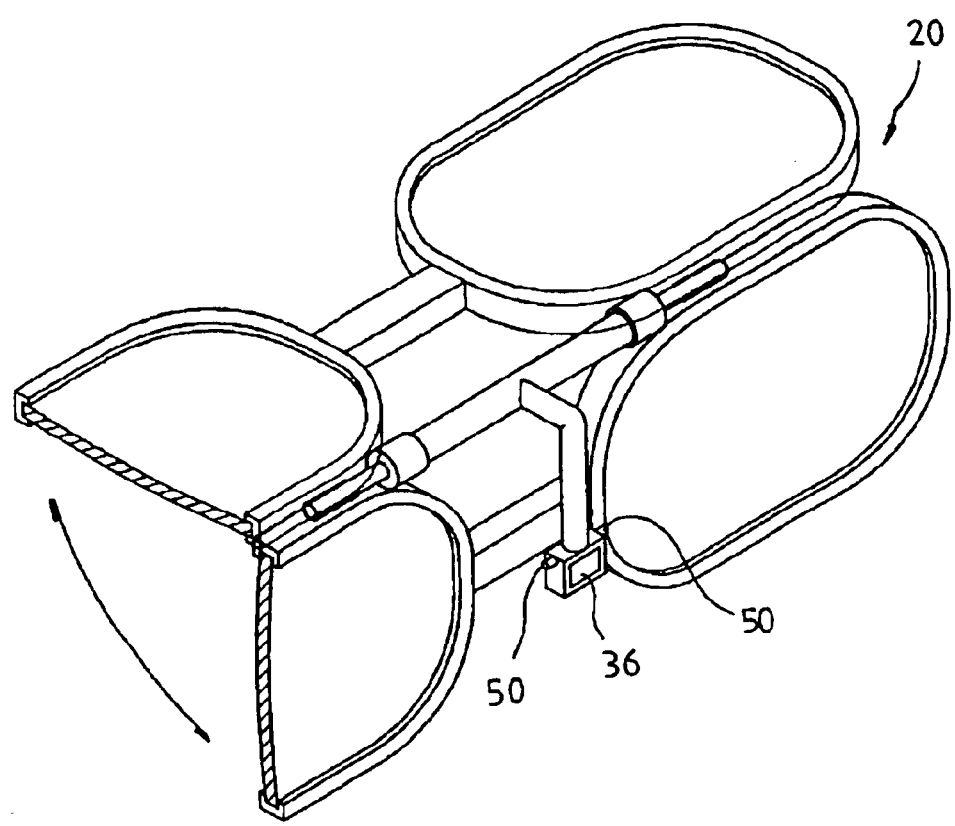
FIG. 4 is a view similar to FIG. 1 showing that the sunglass unit is fixed to the eyeglasses and sunglasses are pivoted upward.

When the ambient light conditions require not using the sunglass lenses 14, 15, the sunglass lenses 14, 15 can be pivoted upward without detaching the detachable sunglass unit 20 as shown in FIG. 4. When the sunglass lenses 14, 15 are pivoted upward, since the sunglass-connecting member 35 is attached and fixed to the eyeglass-connecting member 16, the pipe member 33 remains stationary, and the connecting rod 31 is rotated within the pipe member 33. Since the bent portion 32 presses against the inner surface of the pipe member 33, due to the elastic deformation produced when the bent portion 32 is inserted into the pipe member 33, when pivoting force disappears, the pivoting device 30 keeps the upwardly pivoted state.

In order to pivot the sunglass lenses 14, 15 back to their service state, they are pivoted downward. Friction between the pipe member 33 and the bent portion 32 again keeps the downwardly pivoted back state.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A detachable sunglass unit for detachably attaching sunglasses to eyeglasses, comprising:
   a) a first sunglass lens;
   b) a second sunglass lens;
   c) a first sunglass frame holding the first sunglass lens;
   d) a second sunglass frame holding the second sunglass lens;
   e) a pivoting device provided between the first sunglass frame and the second sunglass frame;
   f) a sunglass-connecting member extending from the pivoting device;
   g) an eyeglass-connecting member provided on the center of the eyeglasses and engaging with the sunglass connecting member;
   wherein the pivoting device comprises an elastic connecting rod, and a pipe member that surrounds the connecting rod; wherein the connecting rod comprises a first end portion that is fixed to the first sunglass frame, a second end portion that is fixed to the second sunglass frame, and a bent portion between the first end portion and the second end portion; wherein the bent portion is inserted into the pipe member, and the internal diameter of the pipe member is smaller than the width of the bent portion, whereby the bent portion is elastically deformed in the pipe member.

2. The detachable sunglass unit of claim 1, wherein the pivoting device further comprises caps that engage with both ends of the pipe member.

3. The detachable sunglass unit of claim 1, wherein the sunglass-connecting member is attached to the eyeglass-connecting member magnetically.

4. The detachable sunglass unit of claim 3, wherein the eyeglass-connecting member comprises a connector body, an insertion hole provided in the connector body, and an eyeglass permanent magnet provided in the connector body, wherein the sunglass-connecting member comprises an extension member that comprises two ends, an insertion body and a sunglass permanent magnet, wherein one end of the extension member is fixed to the pivoting device, and the insertion body is attached to the other end of the extension member, wherein the sunglass permanent magnet is provided in the insertion body in a way that the sunglass permanent magnet contacts with the eyeglass permanent magnet when the insertion body is inserted into the insertion hole.

5. The detachable sunglass unit of claim 4, wherein the insertion body and the sunglass permanent magnet are integrated.

6. The detachable sunglass unit of claim 4, wherein the insertion body of the sunglass-connecting member comprises one or more stop projections, and the connector body of the eyeglass-connecting member comprises one or more stop recesses that engage with the stop projections, whereby excessive insertion of the insertion body into the insertion hole is prevented.

7. The detachable sunglass unit of claim 6, wherein the pivoting device further comprises caps that engages with both ends of the pipe member.

* * * * *